Sept. 8, 1942.    M. DRAEMANN    2,294,894
PROCESS AND APPARATUS FOR MAKING SHARP-EDGED THREADS, CORDS,
RIBBONS, OR BANDS, PROFILED STRIPE AND SO FORTH FROM PLASTIC
MASSES, ARTIFICIAL AND NATURAL DISPERSIONS AND EMULSIONS
Filed July 4, 1939
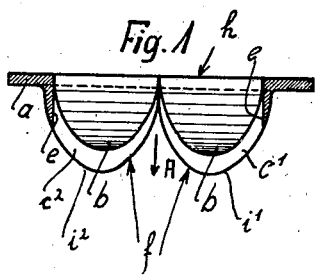
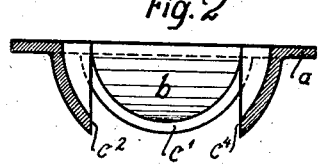
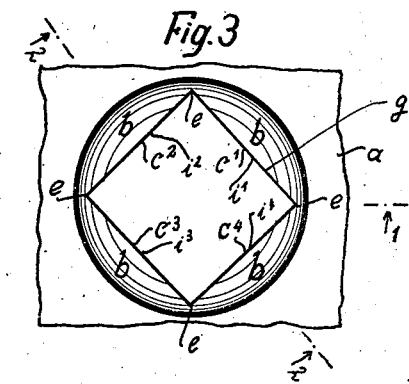
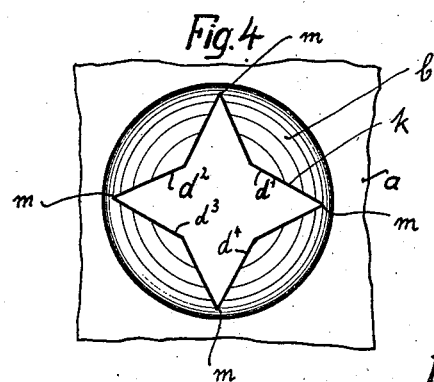
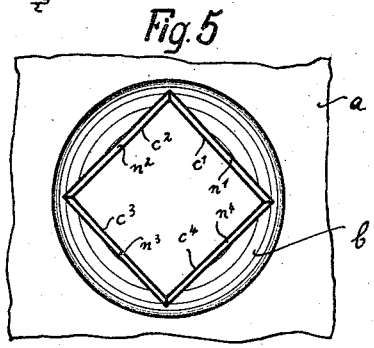
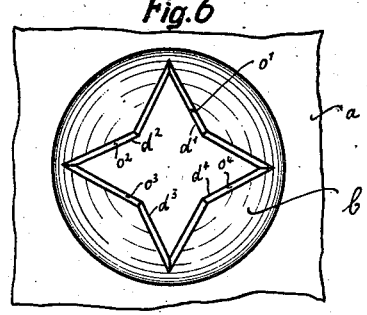
INVENTOR:
Max DRAEMANN
his attorney Patented Sept. 8, 1942

2,294,894

UNITED STATES PATENT OFFICE 2,294,894

PROCESS AND APPARATUS FOR MAKING SHARP-EDGED THREADS, CORDS, RIBBONS OR BANDS, PROFILED STRIPE, AND SO FORTH FROM PLASTIC MASSES, ARTIFICIAL AND NATURAL DISPERSIONS AND EMULSIONS

Max Draemann, Cologne, Germany, vested in the Alien Property Custodian

Application July 4, 1939, Serial No. 282,778
In Germany July 9, 1938

5 Claims. (Cl. 18—8)

Attempts have already frequently been made to produce sharp-edged threads and other profiled elements, such as cords, tapes, bands, ribbons, of plastic masses, more particularly caoutchouc, by extruding the mass from nozzles having convex inner surfaces or inner surfaces which bulge in towards the nozzle axis. In this way the lateral expansion of the material produced by the pressing pressure is removed or restricted on the exit from the nozzle. If it is desired to produce sharp-edged threads or other profiled elements from rubber dispersions and the like, or from mixtures thereof, the nozzle length must be chosen somewhat large so that a substantial coagulation can already take place within the nozzle, since otherwise the edge shape is lost immediately on issuance from the nozzle. In the case of rubber solutions drag effects occur, which make the sharp edges of the resulting profile rough, on account of the friction arising in the points or cusps between the convex nozzle inner surfaces of such a sharp-edged nozzle.

The object of the present invention is to provide a process and an apparatus which, both in the case of the production of sharp-edged threads from plastic masses, more particularly latex or caoutchouc dispersions of artificial or natural nature, as well as in the case of the production from caoutchouc solutions, emulsions and the like, enables the sharp edges to be obtained which are necessary in the case of an edged profile and the disadvantages mentioned above to be avoided. According to the invention, in which the same nozzles can be used for working dispersions as well as caoutchouc solutions and the like, the procedure is such that the suitably prepared plastic mass or dispersion and the like is extruded out of a nozzle the inner surfaces of which, regarded in the direction of pressure, project to varying extents or have different lengths. In this way a time difference is attained between the issuance of the edges and that of the side surfaces of one and the same cross section, and at the same time a friction path varying in length for the various cross section parts.

The nozzle serving for carrying out the process preferably has surfaces of flat or plane formation. These surfaces may, by formation or provision of special appendages or projections of the nozzle plate, be of various lengths or project to varying extents in the direction of pressure.

For carrying out the process preferably a nozzle is used the end wall of which is in the form of a calotte in which the nozzle opening is cut with the convex edges in such a way that at the edges becoming exposed thereby the thread or a band or the like leaves the surface of the nozzle earlier than at the convex side surfaces.

In this way, for example in the case of a caoutchouc thread made from solution, the drag is removed at the edge before its removal at the side surfaces, the edge may form without disturbance and then leaves the nozzle with the same velocity as the inner core of the thread being formed. When making such a thread from dispersions on the other hand the dispersion issuing from the nozzle at the edges can be brought into contact with the coagulating agent prior to that issuing at the side surfaces, as a result of which the edges are already hardened when the side surfaces commence to issue and to coagulate. Deformation beyond the permissible extent, that is to say beyond the swelling up to the filling out of the rectangular or quadrangular cross section, is accordingly no longer possible in both cases.

In order farther to explain my invention, reference is had to the accompanying drawing wherein:

Fig. 1 is a sectional view of a nozzle having a square orifice taken on line 1—1 of Fig. 3, Fig. 2 is a sectional view of the nozzle taken on line 2—2 of Fig. 3, Fig. 3 is a plan view of the delivery end of the nozzle having a square orifice, Fig. 4 is a plan view of the delivery end of a different embodiment of a nozzle having a star-shaped orifice, Fig. 5 is a plan view of a nozzle having a square orifice similar to that shown in Fig. 3, wherein, however, the inner surfaces of the orifice are slanted toward the boundary line of the orifice at the delivery end of the nozzle, and Fig. 6 is a plan view of a nozzle having a star-shaped orifice similar to that shown in Fig. 4, wherein, however, the inner surfaces of the orifice are slanted toward the boundary line of the orifice.

Referring now to Figs. 1–3, $a$ indicates a nozzle plate having an outlet portion $b$ with a wall bulged outwardly on the delivery end $f$ of the nozzle. Preferably the bulged outlet portion $b$ is of spherical shape and has the form of a calotte. The wall of the nozzle plate $a$ may be comparatively thin, even if the nozzle is to be used for the extrusion of caoutchouc dispersions.

The outlet portion $b$ has a polygonal orifice $g$ for the extrusion of the mass in its bulged wall. Said orifice $g$ is formed by cutting a square orifice with straight sides $c_1$, $c_2$, $c_3$, $c_4$ in the spherical portion $b$, so that the corners $e$ of the polygonal orifice $g$ are nearer to the inlet end $h$ of the nozzle than the center portions $i_1$, $i_2$, $i_3$, $i_4$ of the polygonal orifice. In other words, the sides $c_1$, $c_2$, $c_3$, $c_4$ of the orifice $g$ are bulged outwardly in the direction A of the extrusion of the plastic mass through the nozzle.

When a plastic mass is extruded through above described nozzle, the corners of the thread emerging from the nozzle are formed by the corners $e$ of the orifice and the sides of the thread are formed by the sides $c_1$, $c_2$, $c_3$, $c_4$ of the orifice. As the corners $e$ of the orifice are nearer to the inlet end $h$ of the nozzle than the center portions $i_1$—$i_4$ of the sides $c_1$—$c_4$ of the orifice, the corners of successive cross-sections of the thread are formed prior to the sides of said successive cross-sections of the thread. Preferably, the extruded mass is treated with a coagulating agent upon leaving the delivery end $f$ of the orifice, so that the corners of successive cross-sections of the thread are already hardened when the emersion and coagulation of the sides of the thread connecting the edges of the cross-sections start, whereby an undesired deformation of the cross-sections of the thread is eliminated and the finished thread is provided with a sharp-edged cross-section.

In the embodiment of a nozzle shown in Fig. 4, a polygonal orifice $k$ is arranged in the bulged outlet portion $b$ of the nozzle plate $a$ in such a way, that the edges $m$ of the orifice are nearer to the inlet end of the nozzle than the center portions of the sides of the orifice. The sides $d_1$, $d_2$, $d_3$, $d_4$ of the polygonal orifice, however, which connect two corners $m$ of the orifice, are composed of two straight portions arranged at an angle with respect to each other so as to form a star-shaped orifice. Instead of composing each side of the polygonal orifice of two straight portions as shown in Fig. 4, each side connecting two corners of the orifice could be curved, if desired.

In order to facilitate the separation of the extruded mass from the inner surfaces of the orifice and to reduce the path of friction, the inner surfaces $n_1$—$n_4$ (Fig. 5) or $o_1$—$o_4$ (Fig. 6) of the sides of the polygonal orifice may be slanted toward the boundary line of the polygonal orifice at the delivery end of the nozzle, whereby the orifice of the nozzle is conically widened in the direction of the extrusion of the mass.

Not only can threads be made by the new process but also bands, ribbons, strips and other profiled elements, for example as sealing tapes or as decorative strips.

What I claim is:

1. A method of making sharp-edged threads, filaments, strips or the like from plastic masses, such as artificial and natural dispensions, emulsions, solutions or the like, comprising the steps of extruding said mass through a polygonal orifice having its sides bulged outwardly in the direction of the extrusion between the corners of the polygon, and treating the extruded mass with a coagulating agent upon leaving the delivery end of the orifice so as to harden the corners of successive cross-sections of the thread or the like prior to the sides of the cross-sections.

2. As a new article of manufacture a nozzle for the extrusion of plastic masses, such as artificial and natural dispersions, emulsions, solutions or the like, comprising an outlet portion with a wall bulged outwardly on the delivery end of the nozzle, said outlet portion having a polygonal orifice in said bulged wall, and the corners of said polygonal orifice being arranged nearer to the inlet end of the nozzle than the center portions of the sides of the polygonal orifice.

3. As a new article of manufacture a nozzle for the extrusion of plastic masses, such as artificial and natural dispersions, emulsions, solutions or the like, comprising a spherical outlet portion protruding on the delivery end of the nozzle, said spherical outlet portion having a polygonal orifice, and the corners of said polygonal orifice being arranged nearer to the inlet end of the nozzle than the center portions of the sides of the polygonal orifice.

4. As a new article of manufacture a nozzle for the extrusion of plastic masses, such as artificial and natural dispersions, emulsions, solutions or the like, comprising an outlet portion with a wall bulged outwardly on the delivery end of the nozzle, said outlet portion having a polygonal orifice in said bulged wall, the corners of said polygonal orifice being arranged nearer to the inlet end of the nozzle than the center portions of the sides of the polygonal orifice, and the inner surfaces of the polygonal orifice being slanted toward the boundary line of the polygonal orifice at the delivery end of the nozzle.

5. As a new article of manufacture a nozzle for the extrusion of plastic masses, such as artificial and natural dispersions, emulsions, solutions or the like, comprising a spherical outlet portion protruding on the delivery end of the nozzle, said spherical outlet portion having a polygonal orifice, the corners of said polygonal orifice being arranged nearer to the inlet end of the nozzle than the center portions of the sides of the polygonal orifice, and the inner surfaces of the polygonal orifice being slanted toward the boundary line of the polygonal orifice at the delivery end of the nozzle.

MAX DRAEMANN.